United States Patent [19]

Dompas

[11] 4,393,296
[45] Jul. 12, 1983

[54] APPARATUS FOR THE CONTINUOUS MANUFACTURE OF METALLIC ANODES FROM MOLTEN METAL

[75] Inventor: John M. A. Dompas, Olen, Belgium

[73] Assignee: Metallurgie Hoboken-Overpelt, Brussels, Belgium

[21] Appl. No.: 241,612

[22] Filed: Mar. 9, 1981

Related U.S. Application Data

[62] Division of Ser. No. 957,445, Nov. 3, 1978, abandoned.

[30] Foreign Application Priority Data

Nov. 16, 1977 [LU] Luxembourg ............... 78531
Jun. 21, 1978 [LU] Luxembourg ............... 79853

[51] Int. Cl.³ .................... B23K 7/02; B23K 9/00
[52] U.S. Cl. ................... 219/121 PC; 219/121 PX; 219/121 PN; 219/79; 219/159; 266/50; 266/69
[58] Field of Search ................. 219/121 PC, 121 PY, 219/121 PX, 121 PH, 121 PN, 121 LY, 121 LG, 121 LX, 79, 76.16, 158–160; 83/565; 228/49, 46, 160; 266/50, 52, 69; 198/952, 779, 342

[56] References Cited

U.S. PATENT DOCUMENTS

| | | | |
|---|---|---|---|
| 3,443,803 | 5/1969 | Wernicke | 266/50 |
| 3,443,805 | 5/1969 | Greenberger | 266/50 |
| 3,538,297 | 11/1970 | Maniero | 219/121 PY |
| 3,942,566 | 3/1976 | Schmidt | 83/565 |
| 3,950,189 | 4/1976 | Lange et al. | 219/121 PC |
| 4,003,059 | 12/1977 | Brolund et al. | 219/121 PX |
| 4,039,799 | 8/1977 | Stumpf | 219/121 LG |
| 4,151,034 | 4/1979 | Yamamoto et al. | 219/121 PX |
| 4,156,125 | 5/1979 | Brown | 219/121 PV |
| 4,220,318 | 9/1980 | Anderson et al. | 198/342 |

*Primary Examiner*—M. H. Paschall
*Attorney, Agent, or Firm*—Pennie & Edmonds

[57] ABSTRACT

Metallic pieces of predetermined shape, e.g., anodes, are continuously manufactured from molten metal, e.g., impure molten copper, by continuously casting the molten metal in an inclined molding cavity (13) formed by two endless moving belts (14) and (15) and by two moving side dams (20) and (21) so as to produce a hot metallic strip (4), and by cutting the hot strip, when it has left the molding cavity, with at least one plasma torch (10) along a profile (27) such that anodes (11) with a low waste coefficient are obtained. In this way, flat copper anodes with a thickness of between 40 and 50 mm can be produced.

13 Claims, 19 Drawing Figures

Fig. 6
Fig. 7
Fig. 8
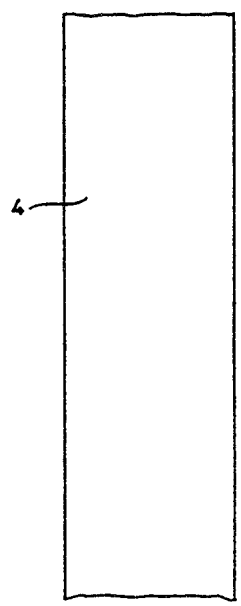
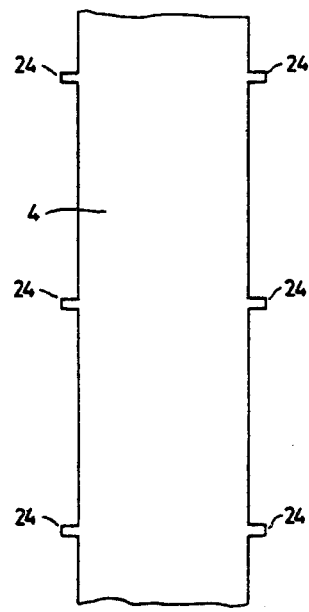
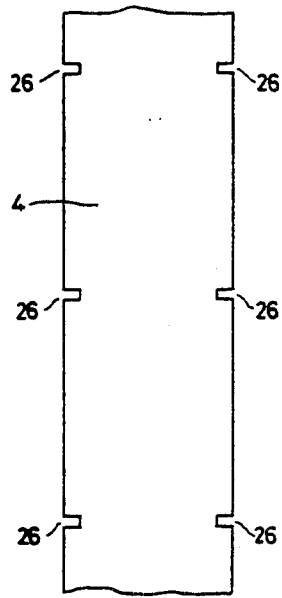
Fig. 9
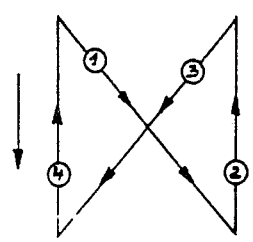

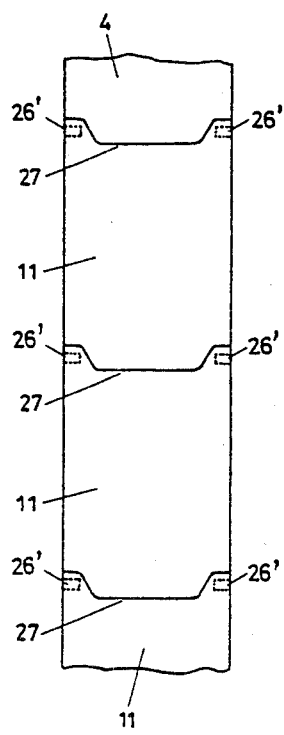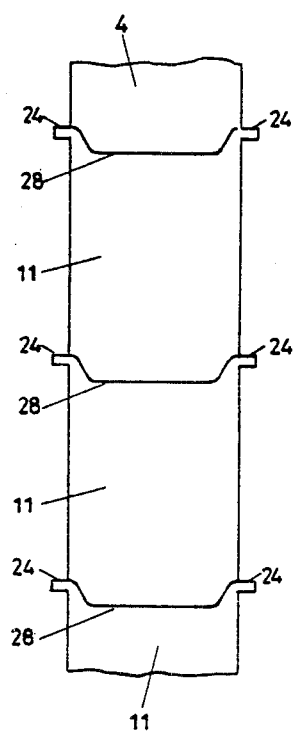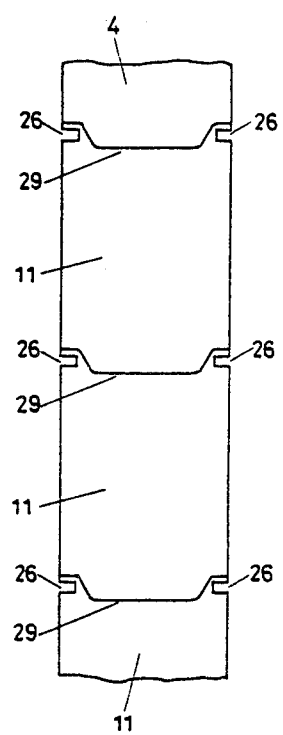

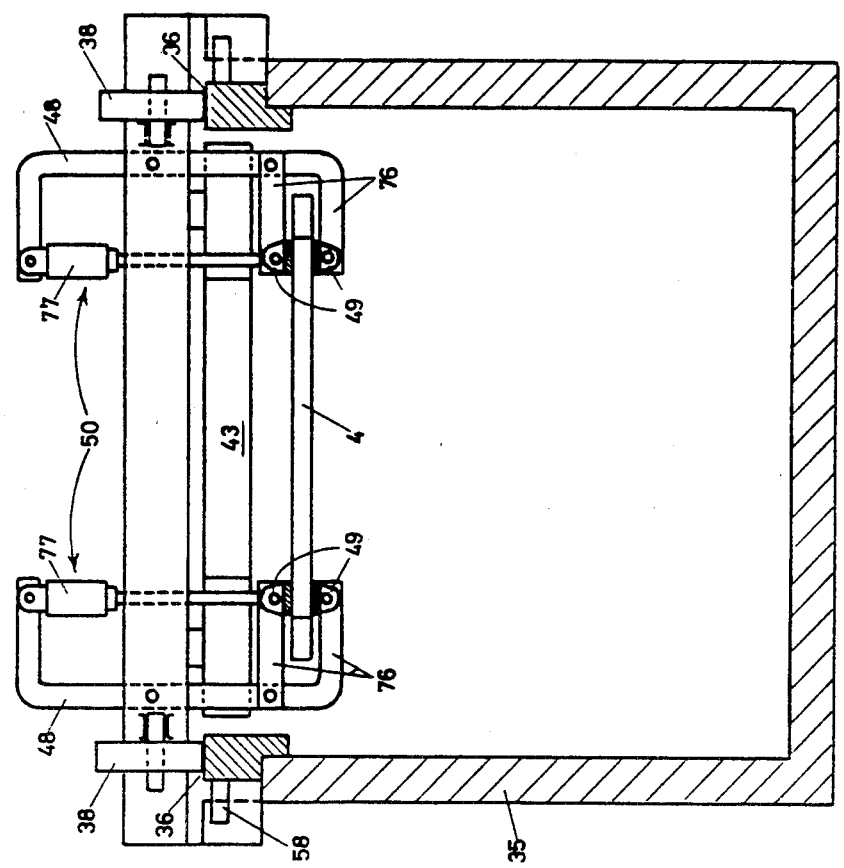

APPARATUS FOR THE CONTINUOUS MANUFACTURE OF METALLIC ANODES FROM MOLTEN METAL

This is a division of application Ser. No. 957,445, filed Nov. 3, 1978, now abandoned.

TECHNICAL FIELD

This invention relates to the manufacture of metallic pieces of predetermined shape. More particularly it relates to an apparatus for the continuous manufacture of metallic pieces, e.g., anodes, from molten metal, e.g., copper, whereby the molten metal is continuously cast, e.g., in an inclined molding cavity formed by two movable belts and by two movable side dams, so as to produce a metallic strip, and the strip, while still hot, is cut to shape after it has left the molding cavity. Metallic anodes produced according to the present invention may be provided with suspension elements which facilitate their use in electrolysis cells, such as in the electrolytic refining of copper.

BACKGROUND ART

The continuous production of metallic anodes from molten metal has been described in U.S. Pat. Nos. 3,504,429 and 3,860,057, British Pat. No. 1,325,625 and German Offen. No. 2,250,792. In these continuous prior art processes, the metal strip is cut with a shear or a press. Unfortunately, none of these methods allows the direct manufacture of anodes shaped like those obtained by the slower, and therefore less economical conventional method of batch-wise casting in separate molds mounted on a casting wheel. Anodes produced by the batch-wise technique have a prescribed thickness of some 40 to 50 mm and their shape is well known to those skilled in the art; in particular, their upper profile is characteristically designed to minimize the mass of that portion of the anode which is not immersed in the electrolytic refining bath, consistent with the structural stability of the anode. Anodes produced by batch-wise conventional methods are also flat enough to allow a minimum distance between electrodes in the electrolytic refining bath without risk of short-circuit. These three requirements (thickness, specific upper profile and flatness) cannot jointly be met by previously known continuous processes. On the one hand, the maximum thickness of anodes produced by known continuous processes is about 28 mm, when cut with shears, and only 15 mm when cut using a press. In addition, the shear cut method does not permit achievement of the above-mentioned upper profile without deforming the anode and thus impairing its flatness.

As a result of these drawbacks, prior continuous processes produce anodes with a high waste coefficient, (25 to 35%), said waste coefficient being the fraction, in percent by weight, of the anode that has to be remelted after electrolytic refining. These known processes also suffer the drawback in that a storage loop must be provided between the casting device and the cutting device. Within this storage loop, the cast metal is subjected to a rather strong bending stress, which very impure copper, such as copper with a high lead content, cannot withstand. The use of these known processes is thus limited to the production of anodes of relatively pure copper.

A need has therefore existed in the metallurgical art for a way of continuously producing metallic anodes from relatively impure molten metal and which satisfies the standard requirements of thickness, profile and flatness without engendering a high waste coefficient.

Accordingly, it is an object of the present invention to provide a process and apparatus for the continuous manufacture of metallic anodes from relatively impure metal, which anodes possess satisfactory thickness, profile and flatness with minimal waste of material.

Another object is to provide a process and apparatus as aforementioned which are adaptable to the use of very impure copper, e.g., blister and/or scrap copper.

These and other objects of the invention as well as a fuller understanding of the advantages thereof, can be had by reference to the following description, drawings and claims.

DISCLOSURE OF THE INVENTION

The foregoing objects are achieved according to the present invention whereby a continuously cast metallic strip is cut with at least one plasma torch along a specific profile such that anodes with a low waste coefficient are obtained, i.e., anodes the fraction of which that is not immersed during electrolytic refining is substantially reduced to the minimum consistent with the structural integrity of the anode. Suitable anode profiles will be familiar to those skilled in the art of electrolytic refining.

By using a plasma torch as a cutting means, it is possible to produce copper anodes with a thickness of between 40 and 50 mm, provided the strip is cut when its temperature is still at least about 800° C. In such circumstances the plasma torch should be fed by a source of at least about 1,000 amperes in order to avoid the risk of leaving burrs or of producing reweldings in the cut.

The number of plasma torches to be used depends of course upon the desired speed of production. When several plasma torches are used, it is advantageous to operate them in parallel.

To facilitate the cutting operation and subsequent handling of the produced anodes, it is desirable to bring the metallic strip leaving the inclined molding cavity into a horizontal position before cutting it. In doing so, the strip is preferably guided into said horizontal position along a slightly curved path, the maximum curvature of which is desirably less than 0.083 m$^{-1}$ (the maximum curvature is the reciprocal of the minimum radius of the curve); otherwise, cracks could appear in the copper strip as it travels along said path, since copper, especially copper with a high lead content (0.05-0.2% by weight), is very brittle when hot. For the same reason it is desirable to support the strip along said path. In addition, it is desirable to cast at a speed, preferably between about 3 and 6 meters per minute, such that the metallic strip leaving the molding cavity is still very hot, the surface of said strip having a temperature preferably between about 980° and 1010° C., and has to be cooled, preferably to a surface temperature of between about 800° and 900° C., by the time it reaches the cutting stage. Such cooling can be achieved and regulated by direct contact with a liquid coolant, so as to yield a fine grained metallic structure which is less brittle at elevated temperature than a coarse grained structure.

The present invention relates to the apparatus for carrying out the process. This apparatus comprises a continuous casting machine equipped with an inclined molding cavity formed by two movable belts and two movable side dams, and a machine for cutting the cast metallic strip. The apparatus is characterized in that the machine for cutting the cast metal strip into uniform pieces comprises at least one plasma torch and means for guiding the torch(es) along the aforementioned profile. In particular, the cutting machine comprises a cutting zone, a carriage located above the moving metallic strip and adapted to travel in said zone in the same direction as the strip as well as in the opposite direction, a thermal cutting device including at least one plasma torch mounted on and guided by said carriage and which can travel in a direction transverse to the direction of the moving strip, a roller conveyor supporting the moving strip in the cutting zone, and an evacuation zone for the cut pieces.

In the apparatus of the invention, it is important that the aforementioned rollers of the strip conveyor are kept at a sufficient distance from the plasma torch(es) of the cutting device to avoid being damaged. Conventional means for laterally or vertically withdrawing the supporting rollers from the cutting zone when the cutting device is approaching, and for restoring their supporting location when the cutting device is moving away are of undesirably complex structure and are difficult to operate since each roller must be provided with its own moving-and control device. The apparatus of the present invention, on the other hand, avoids this drawback because it has means for moving the roller conveyor in the cutting zone in the same direction as the moving metallic strip so that the cutting operation can be carried out without damaging the individual rollers. Advantageously, the roller conveyor is made up of an endless conveyor the upper part of which supports the moving metallic strip and which can extend into the evacuation zone where it supports and conveys the cut anode pieces. The endless roller conveyer advantageously also comprises two parallel endless chains to which are associated supports for the axles of the rollers.

The apparatus of the invention is desirably equipped with means for spraying a cooling liquid below the lower surface of the cut strip in the cutting zone and a tank for collecting the sprayed liquid.

Advantageously the carriage is provided at its lower part with a protective heat screen, which can be formed by a box in which a cooling liquid is allowed to circulate. The carriage can also be provided with means for coupling it to the strip during the cutting operation.

The thermal cutting device is preferably formed by two plasma torches disposed in such way that they can operate in parallel.

The following description of three preferred modes of the present process, product and apparatus, given by way of a non-limiting example and illustrated by the accompanying drawings, will aid in a better understanding of the invention and its advantages.

BRIEF DESCRIPTION OF THE DRAWINGS

In the accompanying drawings:

FIG. 6 is a plan view of the as-cast strip leaving the casting machine of FIG. 1, which has been equipped with side dams of the type represented in FIG. 3;

FIG. 7 is a plan view of the as-cast strip leaving the casting machine of FIG. 1, which has been equipped with side dams of the type represented in FIG. 4;

FIG. 8 is a plan view of the as-cast strip leaving the casting machine of FIG. 1, which has been equipped with side dams of the type represented in FIG. 5;

FIG. 9 is a diagram of the cyclic movement of the plasma torch component of the cutting machine of FIG. 1;

FIG. 10 is a plan view of the strip of FIG. 6 cut into anodes;

FIG. 11 is a plan view of the strip of FIG. 7 cut into anodes;

FIG. 12 is a plan view of the strip of FIG. 8 cut into anodes;

FIG. 19 is a cross-section taken along line D—D of FIG. 17.

DESCRIPTION OF PREFERRED EMBODIMENTS

Figure 1:
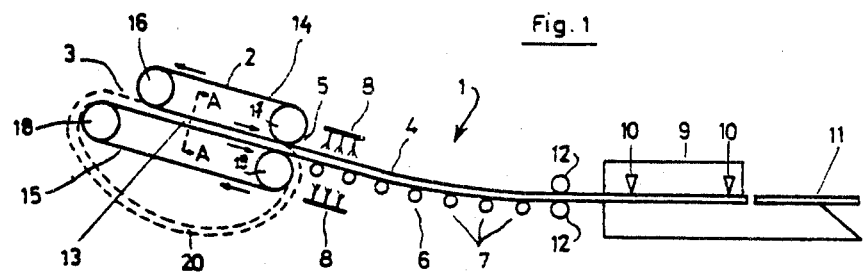
FIG. 1 is a schematic vertical longitudinal section of the apparatus of the present invention being used for the production of anodes according to the process of the invention, said apparatus comprising essentially a casting machine, a device for guiding the cast strip, and a cutting machine.
Figure 2:
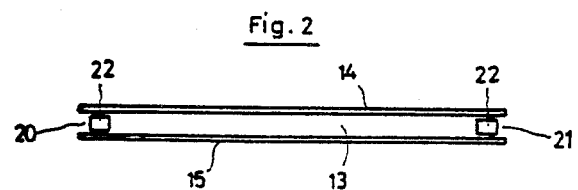
FIG. 2 is an enlarged cross-section taken along line A—A across the mold of the casting machine of FIG. 1.
Figure 3:
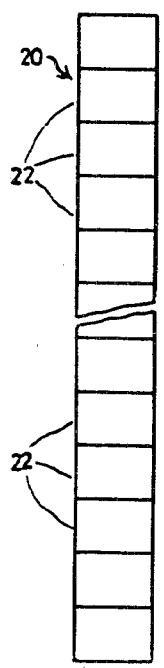
FIG. 3 shows schematically a part of a side dam of the casting machine of FIG. 1, utilized in a first mode of carrying out the process of the invention.
Figure 4:
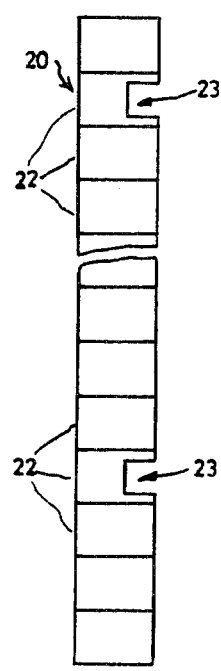
FIG. 4 shows schematically a part of a side dam of the casting machine of FIG. 1, utilized in a second mode of carrying out the process of the invention.
Figure 5:
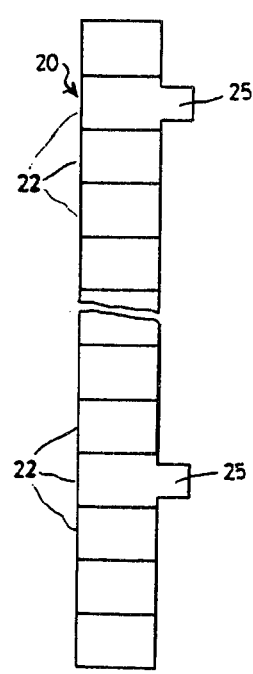
FIG. 5 shows schematically a part of a side dam of the casting machine of FIG. 1, utilized in a third mode of carrying out the process of the invention.

Referring now to FIGS. 1 and 2, an apparatus 1 for carrying out the process of the invention comprises a twin-belt casting machine 2 into which liquid metal is fed at 3 and from which a metallic strip 4 emerges at 5. The apparatus 1 also comprises means or device 6 for supporting and guiding strip 4 made up of a series of freely rotating rolls 7, means or device 8 for sprinkling strip 4 leaving the casting machine 2 with a cooling liquid, a cutting machine 9 provided with two plasma torches 10 working in parallel for cutting the strip into anodes 11, and a pair of pinch-rolls 12 for regulating the travelling speed of the strip in the cutting machine. Sprinkling device 8 can be omitted, if desired, by adjusting the operating conditions such that strip 4 leaves casting machine 2 at a sufficiently low temperature.

The molding cavity 13 of casting machine 2 is formed by two endless metallic belts 14 and 15, revolving respectively around pulleys 16, 17 and 18, 19 in the direction shown by the arrows and cooled by conventional means (not shown) and by two side dams 20 and 21, each formed by a large number of slotted blocks 22 strung on an endless metallic strap (not shown). As belts 14 and 15 revolve, the side dams 20 and 21 revolve with them at the same linear speed.

Referring now to FIGS. 3 through 8, in a first mode of carrying out the invention, use is made of straight side dams 20 and 21 (FIG. 3) so as to produce a metallic strip 4 with straight side edges (FIG. 6).

In a second mode of carrying out the invention, use is made of side dams 20 and 21 provided with recesses 23 (FIG. 4) such as those described in detail in the above-mentioned U.S. Pat. No. 3,860,057 so as to produce a metallic strip 4 provided with laterally projecting lugs 24 (FIG. 7).

In a third mode of carrying out the invention, use is made of side dams 20 and 21 provided with projections 25 (FIG. 5) such as those described in detail in the above-mentioned U.S. Pat. No. 3,860,057 so as to produce a metallic strip 4 provided with lateral recesses 26 (FIG. 8).

In cutting machine 9, which is described in further detail hereinbelow, each of the plasma torches 10 performs a four-stroke cyclic movement such as schematically represented in FIG. 9, wherein the separate arrow indicates the direction of the movement of strip 4, the first and third stroke corresponding each to a cutting of strip 4 by the plasma torch, according to profile 27 of FIG. 10, profile 28 of FIG. 11, or profile 29 of FIG. 12, and the second and fourth stroke corresponding to the return of the torch respectively to an intermediate starting position and to the original starting position. The cutting is performed at constant linear speed, the torch being guided, as will be described in further detail hereinbelow, by means of a guiding device along profiles 27, 28 or 29, said guiding means being mounted on a carriage that follows strip 4 during the cutting operation. Use is made of plasma torches which are fed by a source of at least 1,000 amperes electricity.

In the first mode of carrying out the invention there are thus obtained anodes 11 which still have to be provided with recesses 26′ and a suspension device such as those described in the above-mentioned U.S. Pat. No. 3,504,429, before they can be immersed in an electrolytic refining bath. Anodes 11 obtained by the second mode of the invention each already has a pair of lugs 24, and are ready for immersion in an electrolytic refining bath. Anodes 11 obtained by the third mode of the invention each already has a pair of recesses 26, but must still be provided with a suspension device as described in the above-mentioned U.S. Pat. No. 3,504,429 before their immersion in an electrolytic refining bath. It is, of course, also possible to produce lanodes provided with lugs, and with recesses just beneath said lugs, by using side dams presenting recesses followed immediately by projections. The three above-described modes of carrying out the process of the invention produce anodes having a low waste coefficient and which are free of deformations.

Cutting machine 9 and its operation will now be described in detail by reference to FIGS. 13 to 19.

Cutting machine 9 (see FIG. 13) comprises a torch-bearing carriage 30 and a roller conveyor 31. The metallic strip 4 to be cut, for instance a strip with lugs 24, is supported by the rollers 32 of conveyor 31 and moves in the direction of arrow X. The rollers 32 are connected to two endless chains 33 passing around two toothed wheels or pinions 34 and 34′. The two driving toothed wheels 34 rotate in the direction of arrow Y thereby driving the endless chains 33 and the rollers 32.

Figure 14:
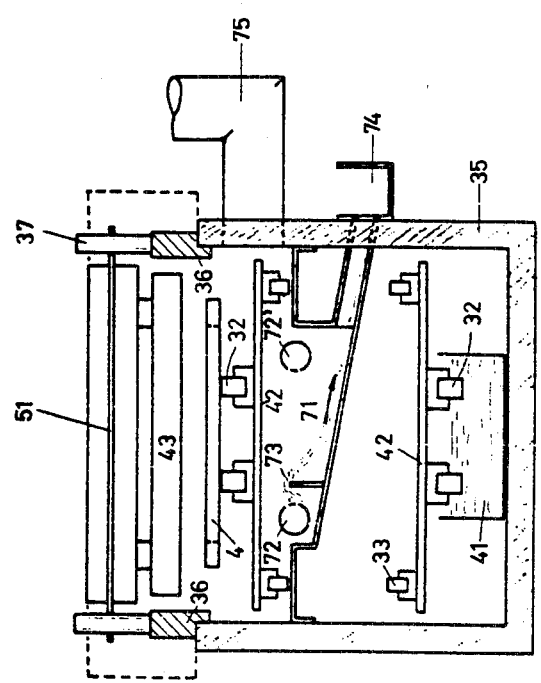
FIG. 14 is a cross-section taken along line B—B of FIG. 13.

Conveyor 31 is mounted in a frame 35, the two upper longitudinal sides of which support two rails 36 (see FIG. 14). Torch-bearing carriage 30 carried by two pairs of wheels 37 and 38 is adapted thereby to travel on rails 36 with a backward and forward motion.

Figure 15:
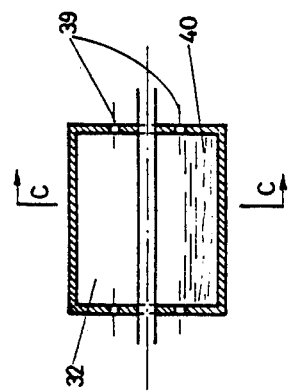
FIG. 15 is an enlarged axial section of a roller of the conveyor of FIG. 13.
Figure 16:
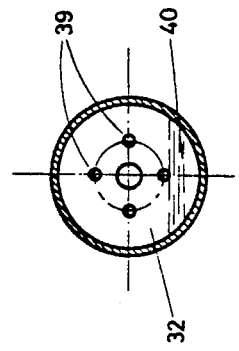
FIG. 16 is a cross-section taken along line C—C of FIG. 15.

FIGS. 15 and 16 show an enlarged view of rollers 32 carrying the metallic strip 4. Since metallic strip 4 may be at a temperature of between 800° and 850° C. when it reaches the cutting machine 9, it is necessary to cool the rollers which support the strip. For this purpose, the rollers 32 are provided with side apertures 39, through which a cooling liquid 40, e.g., water, can be introduced into the space between the axle and the exterior cylinder of the roller. FIG. 14 shows how the rollers 32, after they have left the hot metallic strip 4 at the end of the conveyor 31, dip into a tank of cooling water 41 beneath the conveyor. The rollers 32 are carried by transverse bars 42, both ends of which are fastened to the links of chains 33 which can be of commercial design. The two driving pinions 34 around which pass endless chains 33, can be driven by a direct current motor (not shown) with manual or automatic control. Monitoring of the speed of conveyor 31 is necessary when the chain pitch is not an exact submultiple of the distance between two consecutive anode lugs 24. Otherwise, the two plasma torches 10 which, when the metallic strip 4 is being cut, should each be behind an anode lug 24 and in the middle of the distance separating two consecutive rollers 32, would, at each cutting, come progressively closer to these rollers with the risk of damaging them during the cutting. The travelling speed of the metallic strip 4 on the conveyor 31 is controlled by pinch-rolls 12 (see FIG. 1) whose function is to prevent conveyor 31 from exerting an accidental traction or braking on metallic strip 4 travelling towards cutting machine 9; the result of such a traction would be a stretching or even rupture of the metallic strip, while a braking would cause the formation of a loop in the metallic strip which could result in the development of cracks in the strip or even in its rupture. When the plasma torches 10 are getting closer to the rollers 32, a slight change of the travelling speed of conveyor 31 versus the travelling speed of metallic strip 4 is sufficient to remove the plasma torches sufficiently from the rollers so as to avoid damage to the latter.

In order to protect torch-bearing carriage 30 against the radiant heat of metallic strip 4, the carriage is separated from the strip by a protective screen 43 fastened to the carriage. Screen 43 is made up of a hollow box in which circulates a cooling liquid introduced through inlet 44 (see FIG. 18) and which leaves the box through outlet 45. Screen 43 is also provided with two transversely-shaped slots 46 to allow the passage and accommodate the movement of the plasma torches 10 during the cutting of the metallic strip 4. Screen 43 is also provided at its rear with two recesses 47 (see FIG. 18) which allow the passage of two levers 48, carrying two coupling clutches 49 which are part of a coupling device 50 mounted at the rear of torch-bearing carriage 30 (see FIGS. 17 and 18).

As mentioned above, torch-bearing carriage 30 travels on two rails 36 mounted on frame 35 along conveyor 31, and is carried by two pairs of wheels 37 and 38 of which only wheels 37 are driving. Driving wheels 37 are mounted on an axle 51 supported by two bearings 52 (see FIG. 18) at the front of the carriage, while the two back wheels 38 are each mounted freely on separate shafts 53 supported by bearings 54. An electric motor 55 drives the two front wheels 37 by means of pinions 56 and coupling 57 and brings the torch-bearing carriage 10 back to its starting position after the cutting operation, for example, by means of a conventional relay (not shown). During the entire cutting operation of an anode, torch-bearing carriage 10 is coupled to the metallic strip 4 being cut by means of coupling device 50 mounted at the rear of the carriage and as a result the carriage travels at the same speed as the metallic strip in the direction of arrow X (see FIG. 13). The straight motion of carriage 30 on rails 36 is ensured by four guide rollers 58 (see FIG. 18) resting against the external side of the rails.

Figure 13:
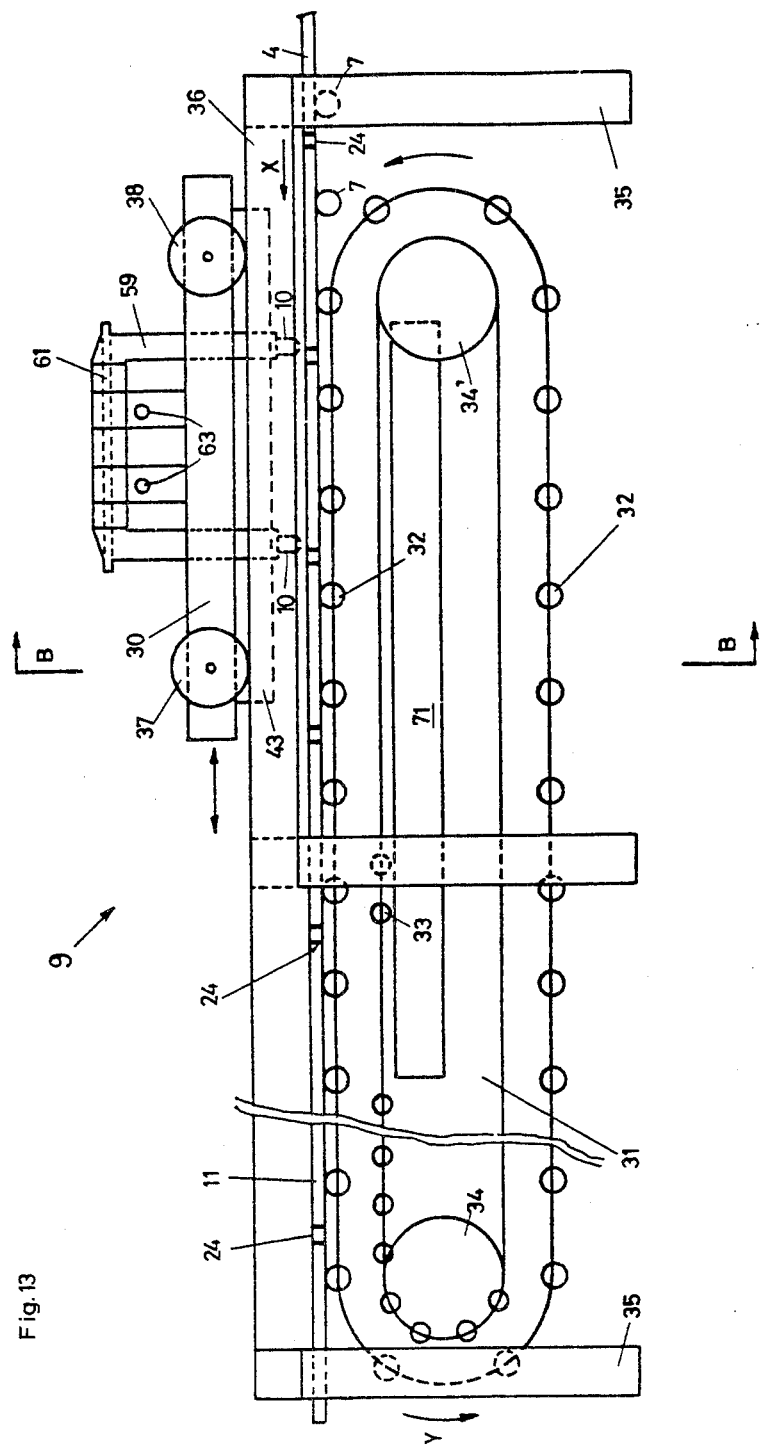
FIG. 13 is a detailed lateral view of the cutting machine of FIG. 1, comprising essentially a carriage bearing two plasma torches and a roller conveyor supporting the strip to be cut.
Figure 17:
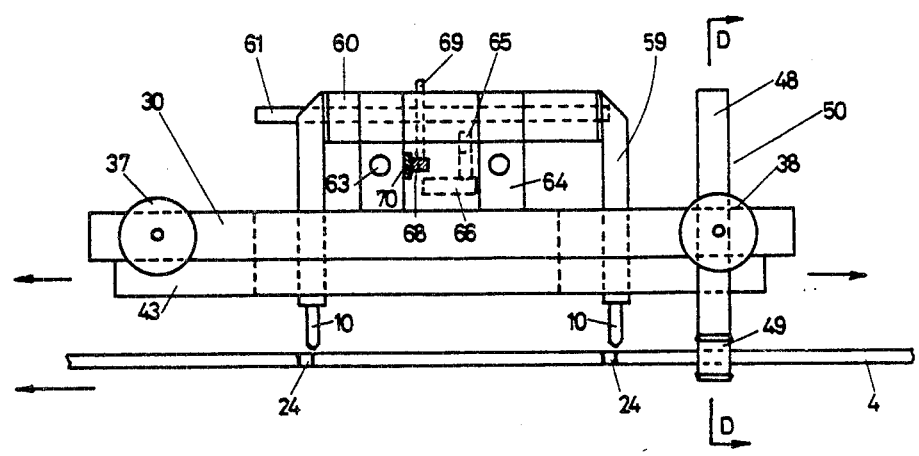
FIG. 17 is a more detailed view of the carriage of FIG. 13.
Figure 18:
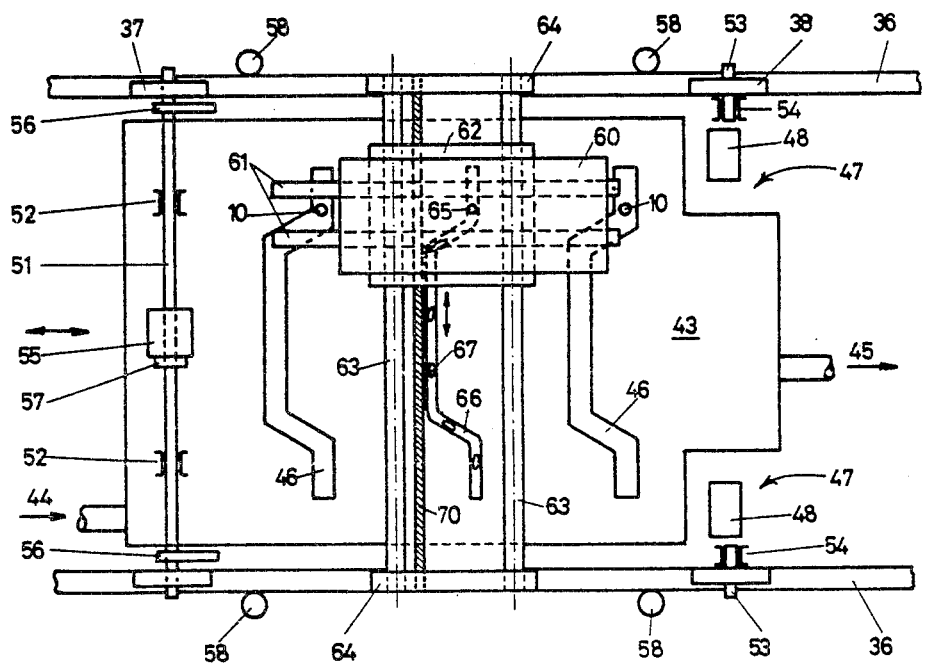
FIG. 18 is a plan view of the carriage of FIG. 17.

Referring to FIGS. 13, 17 and 18, the two plasma torches 10, the lower end of each of which is located a few millimeters above metallic strip 4, are carried by arms 59 fastened to the two ends of an upper table 60 which can glide over two longitudinal shafts 61 which are parallel to rails 36 and which allow a backward and forward motion of table 60 in a direction parallel to rails 36. The two shafts 61 are fastened to a lower table 62 which can glide over two transverse shafts 63, which are perpendicular to rails 36 and which allow a backward and forward motion of the lower table in a direction perpendicular to the rails. The two transverse shafts 63 are carried by two supports 64 mounted on torch-bearing carriage 30.

During the anode cutting operation, the two plasma torches 10 travel along a path the profile of which is identical to profile 28 (see FIG. 11). The path of travel is controlled by a guide rod 65 mounted on a ball-bearing in upper table 60 which carries the two plasma torches 10.

Guide rod 65 travels by rotating in a guide slot 66 which has profile 28 (see FIG. 11) and which is connected to the frame of torch-bearing carriage 30. During the transverse travel of lower table 62 on transverse shafts 63, guide rod 66 and thus also the two plasma torches 10 which are connected to it, travel according to the profile of guide slot 66. The bottom of guide slot 66 is provided with holes 67 which permit the evacuation of dirt such as lubricant residue, thus freeing the way for guide rod 65. The transverse travelling of lower table 62 on shafts 63 is controlled by an electric motor (not shown), located on the lower table and which drives a toothed wheel or pinion 68 (see FIG. 17) mounted at the lower end of a shaft 69. The teeth of pinion 68 engage the teeth of a fixed linear rack 70 disposed transversely on torch-bearing carriage 30. During its rotation, pinion 68 travels along rack 70, dragging with it the lower table 62, which glides over the two transverse shafts 63, and guide rod 65 which travels along guide slot 66, so that the two plasma torches 10 connected to guide rod 65 travel along a path which is identical to that of guide rod 65.

Conveyor 31 is provided, beneath the cutting zone, with a cooling tank 71 (see FIG. 14) located under rollers 32 which support the metallic strip 4. A cooling liquid, the purpose of which is to precipitate the metal vapors formed during the cutting, is fed into tank 71, by means of two conduits 72 and 72' which are provided with a series of small apertures. Conduit 72' sprays water directly under metallic strip 4, while the water brought by conduit 72 flows over a weir 73 and across the inclined bottom of cooling tank 71 toward a gutter 74, dragging with it scales and oxidized metal particles formed during the cutting operation. The fumes formed during the cutting operation are evacuated through stack 75.

During the cutting of the anodes, the torch-bearing carriage 30 is coupled to metallic strip 4 and travels with it. The coupling is achieved by means of two clutches 49 located at the rear of torch-bearing carriage 30, as mentioned above. Clutches 49 which are supported by two arms 76, which themselves are connected to two levers 48, pass through recesses 47 in cooling screen 43. Clutches 49, which are simultaneously driven by a pneumatic or hydraulic cylinder 77, grip the side edges of metallic strip 4 when plasma torches 10 are in cutting position and release the metallic strip when the cutting of two anodes is finished, thus freeing torch-bearing carriage 30 which is then brought back to its cutting position by means of electric motor 55. To avoid violet jarring at the moment of the coupling to metallic strip 4, torch-bearing carriage 30 can be progressively accelerated by means of motor 55, in the travelling direction of metallic strip 4; in this way clutches 49 grip the metallic strip when the speeds of both the torch-bearing carriage and the metallic strip are nearly equal.

At the beginning of a cutting cycle the two torches are disposed behind an anode lug 24 (see FIG. 13). The detection of the lug is effectuated, for example, by means of a detecting cell (not shown).

The linear travelling speed of the driving pinion 68 along rack 70 can be regulated by means of a thyristor device (not shown). By appropriate variation of this speed, it is possible to obtain a constant cutting speed along the non-linear path of guiding rod 65.

The anodes 11 which have been cut, leave the cutting zone, still carried by rollers 32 of conveyor 31, and arrive at an evacuation zone located at the end of conveyor 31, where they are lifted one by one and evacuated by conventional means (not shown).

EXAMPLE

This example illustrates the practice of the present invention according to the second mode described above in making copper anodes. The casting machine is a Hazelett type M 23 machine. The length of the molding cavity is 256 cm and its height 4 cm. The width of the molding cavity is 91.1 cm at the places where the body of the strip is molded, and 117 cm where the lugs of the strip are molded. The molding cavity has a downward inclination of 9°. The distance between the exit of the molding cavity and entrance to the cutting machine is 5 meters. The maximum curvature of the cast strip on its way from the molding cavity to the cutting machine is 0.05 cm$^{-1}$.

The casting speed is approximately 4 m/min. The surface of the copper strip emerging from the molding cavity has a temperature of about 1,010° C. The emerging strip is cooled by direct contact with water so that its surface has a temperature of about 850° C. when it reaches the cutting machine.

The plasma torches used are commercially available from Thermal Dynamics under the trademark Plasmapak M200. The torches are fed by a current of 1,050 amperes electricity. The cutting is performed at a speed of 320 cm/min and yields perfectly cut commercial quality anodes. (It should be noted that the same torch can cut a strip of cold copper of the same thickness with a speed of only 30 cm/min). For the production of anodes intended for the fabrication of starting sheets the same procedure is used, except that the height of the molding cavity is fixed at 4.5 cm and its width at 95 cm at the places where the body of the strip is molded.

The foregoing description of the preferred embodiments is intended to illustrate without limitation the process, product and apparatus of the present invention. It is understood, of course, that changes and variations can be made therein without departing from the scope of the invention which is defined in the following claims.

I claim:

1. An apparatus for cutting a moving metallic strip into uniform pieces along a predetermined profile, comprising:
   (a) a frame;
   (b) a cutting zone;
   (c) a carriage mounted on said frame above said moving metallic strip, said carriage adapted to move within said cutting zone in a direction of movement with the movement of said metallic strip and in the opposite direction;
   (d) a thermal cutting device containing at least one plasma torch, said cutting device mounted on said carriage and adapted to travel in a direction transverse to the direction of movement of said metallic strip;
   (e) an endless roller conveyor having an upper run for supporting said metallic strip in the cutting zone, said roller conveyor adapted to move in said cutting zone in the same direction as said metallic strip, each roller of said roller conveyor including an inner cavity defined by a peripheral surface for supporting said metallic strip and opposed side walls, and a plurality of apertures formed in said side walls providing a communicating path from the exterior of each said roller to its inner cavity for entry of a cooling liquid, said apertures arranged in a position in said side walls to retain a volume of cooling liquid within said inner cavity providing a measure of cooling during movement of each roll along said upper run;
   (f) a tank filled with a cooling liquid, each said roller of said roller conveyor moving through said tank for entry of said cooling liquid through said apertures into said inner cavity thereby to mix with and thereby reduce the temperature of the cooling liquid therein and to cool the peripheral surface and side walls of each said roller before moving toward said upper run; and
   (g) an evacuation zone for the cut metallic pieces.

2. An apparatus according to claim 1 wherein the upper run of the roller conveyer extends into the evacuation zone where it supports and conveys the cut pieces.

3. An apparatus according to claim 1 wherein the endless roller conveyor comprises two parallel endless chains, an axle for each of the rollers, said rollers arranged as a plurality of pairs of rollers disposed along the conveyor, and means supported by and between the endless chains for supporting the axles of paired rollers.

4. An apparatus according to claim 1, said apparatus further comprising means for spraying a liquid coolant below the lower surface of the cut strip in said cutting zone and a tank for collecting the liquid.

5. An apparatus according to claim 1 wherein the carriage is provided at its lower part with a heat screen.

6. An apparatus according to claim 5 wherein the heat screen comprises a box adapted for circulation of a liquid coolant therein.

7. An apparatus according to claim 1 wherein the carriage is provided with means for coupling it to the metallic strip during the cutting operation.

8. An apparatus according to claim 7 wherein the carriage is provided with means for imparting to the carriage a speed close to that of the strip at the moment of the coupling of the carriage to the metallic strip.

9. An apparatus according to claim 1 wherein the carriage is provided with:
   a first element adapted to travel in a direction transverse to the direction of the metallic strip;
   means for moving the first element;
   a second element connected with the cutting device and with a guide rod, said second element being adapted to glide over the first element in a direction parallel to the travelling direction of the strip; and
   a guide slot for the guide rod, the shape of said guide slot corresponding to the predetermined cutting profile.

10. An apparatus according to claim 9 wherein the carriage is provided with means for driving the first element at a speed such that the cutting speed remains constant.

11. An apparatus according to claim 9 wherein the guide rod is mounted on a bearing in the second element.

12. An apparatus according to claims 9, 10 or 11, comprising additionally means for removing and evacuating the fumes generated in the cutting zone.

13. An apparatus according to claim 9, 10 or 11 wherein the thermal cutting device comprises two plasma torches disposed to operate in parallel.

* * * * *